United States Patent
Luckas et al.

(10) Patent No.: US 11,365,061 B2
(45) Date of Patent: Jun. 21, 2022

(54) CONVEYOR

(71) Applicant: IMA-TEC GmbH, Kürnach (DE)

(72) Inventors: Thomas Luckas, Arnstein (DE); Frank Hüttner, Reichenberg (DE)

(73) Assignee: IMA-TEC GmbH, Kürnach (DE)

( * ) Notice: Subject to any disclaimer, the term of this patent is extended or adjusted under 35 U.S.C. 154(b) by 0 days.

(21) Appl. No.: 17/195,938

(22) Filed: Mar. 9, 2021

(65) Prior Publication Data

US 2021/0292094 A1    Sep. 23, 2021

(30) Foreign Application Priority Data

Mar. 9, 2020   (DE) .................... 10 2020 106 350.4

(51) Int. Cl.
   *B65G 27/16*   (2006.01)
   *B65G 27/30*   (2006.01)
   *B65G 27/32*   (2006.01)
   *B65G 27/08*   (2006.01)

(52) U.S. Cl.
   CPC ............. *B65G 27/30* (2013.01); *B65G 27/08* (2013.01); *B65G 27/16* (2013.01); *B65G 27/32* (2013.01)

(58) Field of Classification Search
   CPC ........ B65G 27/08; B65G 27/16; B65G 27/20; B65G 27/28; B65G 27/32; B65G 2812/03; B65G 2812/0304; B65G 2812/0308; B65G 2812/0324; B65B 37/04
   USPC ........................... 198/758, 759, 760; 209/920
   See application file for complete search history.

(56) References Cited

U.S. PATENT DOCUMENTS

| | | | | | |
|---|---|---|---|---|---|
| 4,162,778 | A | * | 7/1979 | Kraft .......................... | B06B 1/10 248/610 |
| 4,168,774 | A | * | 9/1979 | Musschoot ............ | B65G 27/32 198/751 |
| 4,275,978 | A | * | 6/1981 | Brooks ................... | B65G 25/02 414/156 |
| 4,527,747 | A | * | 7/1985 | Scharmer ................ | B06B 1/166 241/26 |
| 4,844,236 | A | * | 7/1989 | Kraus ..................... | B65G 27/04 198/690.2 |
| 5,131,525 | A | * | 7/1992 | Musschoot ............. | B06B 1/166 198/763 |
| 5,584,375 | A | * | 12/1996 | Burgess, Jr. ............ | B06B 1/166 198/750.1 |

(Continued)

*Primary Examiner* — Joseph A Dillon, Jr.
(74) *Attorney, Agent, or Firm* — Smartpat PLC

(57) ABSTRACT

A conveyor for separating, singulating or conveying bulk material comprises a conveying plate, a substructure and a pulse generator for generating an oscillation. The substructure stands on a base surface. The conveying plate is arranged on the substructure at a distance from the base surface. The pulse generator is fixed on the substructure and is/can be brought into an operative connection with the conveying plate. The oscillation generated by the pulse generator can be transmitted to the conveying plate and a force is exerted on the substructure by the oscillation. The conveyor comprises an equalising pulse generator which is fixed on the substructure and creates a counter-oscillation. A counter-force which is in an opposite direction to the force is exerted on the substructure by the counter-oscillation. A resultant force which results from the force and the counter-force and which acts on the substructure is reduced by the counter-force.

10 Claims, 2 Drawing Sheets

(56) References Cited

U.S. PATENT DOCUMENTS

| | | | | |
|---|---|---|---|---|
| 6,044,710 | A  * | 4/2000 | Kurita | B06B 1/0246 |
| | | | | 73/664 |
| 7,383,942 | B2 * | 6/2008 | Kato | B65G 27/12 |
| | | | | 198/757 |
| 2004/0163933 | A1 * | 8/2004 | Jones | B65G 27/20 |
| | | | | 198/752.1 |
| 2006/0096840 | A1 * | 5/2006 | Kato | B65G 27/12 |
| | | | | 198/767 |
| 2009/0272627 | A1 * | 11/2009 | Kraus | B65G 27/32 |
| | | | | 198/617 |
| 2011/0174593 | A1 * | 7/2011 | Mazzini | B65G 47/145 |
| | | | | 198/392 |
| 2016/0039614 | A1 * | 2/2016 | Bott | B06B 3/00 |
| | | | | 198/751 |
| 2017/0082481 | A1 * | 3/2017 | Kageyama | B65G 27/32 |
| 2020/0002100 | A1 * | 1/2020 | Dicristofano | G01G 13/08 |

* cited by examiner

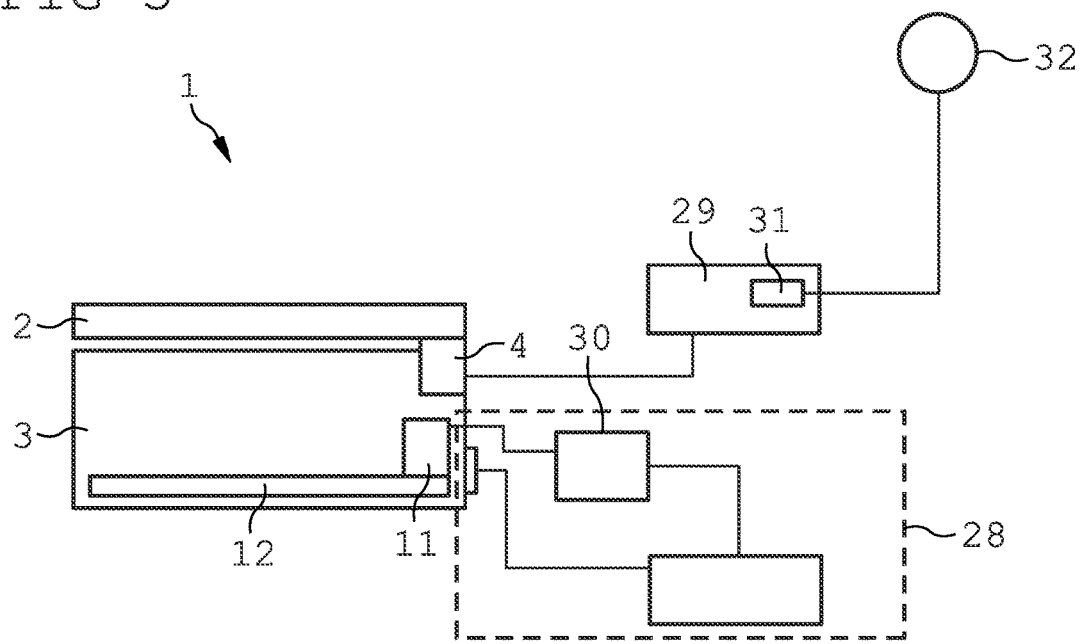
FIG 3
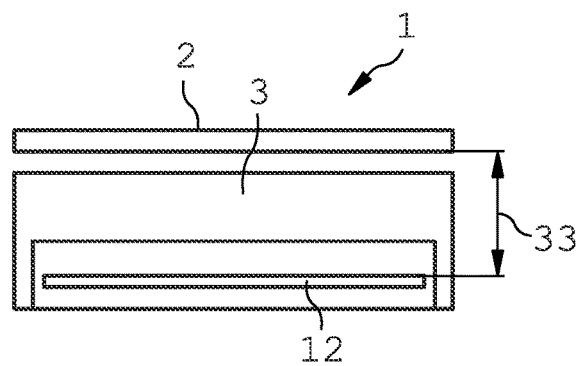
FIG 4
A)
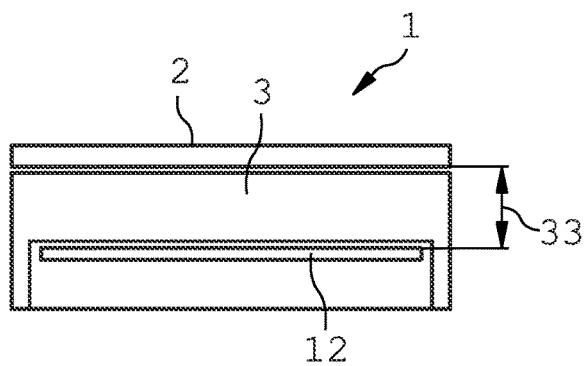
B)

CONVEYOR

CROSS-REFERENCE TO RELATED APPLICATION

This application claims priority to German Patent Application No. 10 2020 106 350.4, filed Mar. 9, 2020.

TECHNICAL FIELD

The disclosure relates to a conveyor for separating, singulating and/or conveying at least one component by means of at least one mechanical pulse.

BACKGROUND

Conveyors are used in particular in order to separate and singulate components by one or more pulses and/or oscillations. "Separate" in the present case means that the components are detached from each other, for example screws or clips which have become caught together, nuts which are attached to each other or the like. In contrast, "singulate" in the present case means that the components are arranged in relation to each other such that they are at a minimum distance from each other and can thus be picked up, for example by a person or a machine.

Frequently, such conveyors are brought into an operative connection with a hopper system, with components which are stored in the hopper system being poured onto the conveying plate. By one or more pulses or oscillations, the components can be conveyed away from the hopper system and displaced on the conveying plate in the direction of a receiving region. In this case, the components are usually also singulated by the pulse or pulses or the oscillation, so that they can be picked up in the receiving region by a machine. The machines used for receiving the components in the receiving region are usually what are called handling devices.

The conveyors described are frequently used within partially or fully automated manufacturing plants which have handling systems which are adapted to the conveyors. The handling systems have for example camera systems by means of which the components which are arranged on the conveying plate can be detected, in order thus to determine which of the components can be picked up from the conveying plate, for example by means of a gripper. Insofar as the handling system ascertains that none of the components can be picked up by means of the gripper, one or more pulses are applied to the conveyor, or the conveyor is caused to oscillate in order to distance the components from each other such that they can be picked up by means of the gripper.

The conveyors known from the prior art, of the type described first hereinbefore, are used in particular in the precision engineering production sector, for example in producing clocks, mobile telephones or the like, i.e. everywhere where components of relatively small dimensions are processed.

The larger the components to be conveyed, the larger the conveyors used also have to be, since greater forces have to be exerted on the components to be conveyed. With the conveyors known from the prior art, it is not possible to scale beyond a certain size, since the necessary pulses or oscillation and the resulting force which acts on the substructure would exceed an acceptable amount. In this case, a limitation arises for scaling not only from the increasingly large forces, which act in particular on the substructure, but in particular also from the fact that the conveyor due to its operation and the vibrations produced thereby also has an adverse effect on adjoining regions of the manufacturing plant.

SUMMARY

It is an object of the present disclosure to provide a conveyor with which components even of a large component size can be conveyed, and in so doing as little vibrations as possible are transmitted to the surroundings.

This object is achieved in that the conveyor comprises at least one equalising pulse generator which is fixed on the substructure, by which pulse generator at least one counter-pulse can be generated, wherein a counter-force which is in an opposite direction to the force is exerted on the substructure by the counter-pulse, and wherein a resultant force which results from the force and the counter-force and which acts on the substructure is reduced by the counter-force. In this case, provision is advantageously made that the pulse generator and the equalising pulse generator are coupled together such that the counter-pulse generated by the equalising pulse generator destructively interferes with the pulse generated by the pulse generator.

Provision is made that the pulse generators have for example a mass and/or can be brought into an operative connection with a mass which is displaceable out of a non-operative position by means of suitable action means and thus applies a pulse to the conveyor. The action means may be for example electromagnetic, electromechanical, hydraulic, pneumatic or similar actuators. Furthermore, provision is advantageously also made that the mass which can be subjected to one of the pulses by one of the pulse generators may comprise one of the elements of the conveyor, for example the conveying plate.

Provision is advantageously made that the pulse generator and the equalising pulse generator can be brought into an operative connection mechanically with each other, for example by means of springs, coupling rods or the like. With such a mechanical coupling, provision is made in particular that the pulse of the pulse generator is transmitted to the equalising pulse generator by a mechanical coupling system such that the pulse and the counter-pulse are in opposite directions to each other.

Particularly preferably, both the pulse generator and the equalising pulse generator are advantageously designed as electromagnetic pulse generators and brought into an operative connection with each other by means of electrical and/or electromagnetic and/or magnetic effects. In this case, it is in particular possible for the pulse generator and the equalising pulse generator to be brought into an operative connection with a control unit, with the control unit generating the pulse by means of the pulse generator and the counter-pulse by means of the equalising pulse generator.

One advantageous implementation of the inventive concept provides that the equalising pulse generator comprises a counter-mass and/or is/can be brought into an operative connection with a counter-mass, wherein the counter-force can be increased by the counter-mass. By such a configuration of the conveyor, it is made possible for the resultant force which acts on the substructure to be able to be reduced further. It is also possible and provided that the counter-mass may be designed such that the counter-force when the conveyor is used as intended is greater than the force.

Provision is advantageously made that the counter-mass can be formed for example by a solid body, for instance a metal part, but alternatively by a liquid, for example a hydraulic fluid which can be introduced into an expandable hydraulic hose.

Parameters by means of which a suitable counter-mass of the conveyor can usefully be selected are in particular a weight of the conveying plate, a weight of the components, dimensions of the components or the like. The greater a mass of the system formed from the pulse generator, the conveying plate and the components is, the larger the counter-mass also has to be in order to be able to generate a sufficiently large counter-force.

One advantageous configuration of the invention provides that the counter-mass is/can be adapted to the conveyor such that an amount of the force is equal to an amount of the counter-force, so that the resultant force can be cancelled completely. Complete cancelling of the resultant force advantageously leads to no forces acting on the substructure and thus affecting of the surroundings of the conveyor being minimised or prevented by its use as intended.

In one advantageous configuration of the conveyor, provision is made that an amount of the counter-pulse which can be generated by the equalising pulse generator is changeable, so that the counter-force can be increased without the counter-mass having to be changed. An increase in the amount of the counter-pulse and/or the amplitude of the counter-oscillation while the frequency of the counter-oscillation remains the same leads to greater acceleration, so that the counter-force can be increased while the counter-mass remains the same.

One advantageous implementation of the inventive concept provides that the substructure comprises a plate receptacle at a distance from the base surface, on which receptacle the conveying plate can be fixed, wherein the pulse generator is/can be brought into an operative connection with the plate receptacle and wherein the conveying plate is/can be brought into an operative connection with the pulse generator by means of the plate receptacle. Particularly preferably, the plate receptacle has a tool-less quick-change system, by means of which the conveying plate can be fixed on the plate receptacle. Such a configuration of the conveyor makes it possible for the conveyor to be adaptable to different demands in a simple manner.

It is furthermore also possible and provided that the conveyor may have oscillation-influencing elements, for example springs, dampers or the like. In this case, provision is made in particular that the plate receptacle can be fixed on the substructure by means of an upper spring arrangement and be resiliently mounted thereby, so that a mechanically resonant system can be formed by the plate receptacle, the conveying plate and the upper spring arrangement, which system can be caused to oscillate by means of the pulse generator.

One advantageous configuration of the invention provides that the substructure comprises at least one stand element, wherein the substructure when used as intended stands on the base surface with the stand element.

In a particularly preferred embodiment of the invention, provision is advantageously made that the substructure may have a plurality of stand elements, wherein at least one of the stand elements comprises a height adjustment mechanism, so that the substructure can advantageously be oriented parallel to the base surface.

In one advantageous configuration of the conveyor, provision is made that at least stand element has vibration-damping properties. Provision is made that such vibration-damping properties can be obtained in particular in that the stand element is produced at least in portions from an elastomer.

One advantageous implementation of the inventive concept provides that the conveyor comprises at least one coupling means, wherein the conveyor can be fixed on the base surface by means of the coupling means. The coupling means may for example be designed as a tab, the tab having a cutout which penetrates through the tab, with a screw which can be able to be screwed to the base surface being able to be passed through the cutout.

Furthermore, provision is advantageously also made that the coupling means may comprise quick-release closures and/or be compatible with quick-release closures, for example with latch hooks, bayonet locks, magnetic catches or the like. Particularly preferably, the coupling means is fixed on the substructure.

One advantageous configuration of the invention provides that the conveyor comprises at least two pulse generators, wherein a first partial conveying pulse can be generated by one of the pulse generators, wherein a second partial conveying pulse can be generated by another of the pulse generators, wherein the first partial conveying pulse and the second partial conveying pulse can be superimposed in the conveying plate to form a conveying pulse, wherein a conveying force can be exerted on the components by the conveying plate which is subjected to the conveying pulse, so that the components arranged on the conveying plate are displaceable from a first storage position into a second storage position. In order to be able to generate conveying forces which are directed in different directions, provision is furthermore advantageously made that the conveyor may also have more than two pulse generators.

In one advantageous configuration of the conveyor, provision is made that the conveyor comprises at least two equalising pulse generators, wherein a first partial counter-pulse can be generated by one of the equalising pulse generators, wherein a second partial counter-pulse can be generated by another of the equalising pulse generators, wherein the first partial counter-pulse and the second partial counter-pulse can be superimposed to form a total counter-pulse, wherein a resultant counter-force is exerted on the substructure by the total counter-pulse, wherein the resultant counter-force is in an opposite direction to a disruptive force exerted on the substructure by the conveying pulse, and wherein the resultant force which acts on the substructure and which results from the resultant counter-force and the disruptive force is reduced by the resultant counter-force. In order to be able to produce a conveyor thus configured particularly efficiently, provision is advantageously made that an equalising pulse generator is associated with each pulse generator.

Particularly preferably, the counter-mass in this case is advantageously designed as a plate-shaped element which is brought into an operative connection with all the equalising pulse generators of the conveyor. In this case, provision is made in particular that the counter-mass can be fixed on the substructure by means of a lower spring arrangement and be resiliently mounted thereby, so that a mechanically resonant system can be formed by the counter-mass and the lower spring arrangement, which system is subjected to the counter-pulse and/or can be caused to counter-oscillate by means of the equalising pulse generator.

One advantageous configuration of the invention provides that the conveying plate is produced at least in portions from an at least translucent material. Furthermore, provision is advantageously likewise made that the conveying plate can be produced also at least in portions from a transparent material. "Transparent" here in the present case means that the conveying plate is completely transparent to visible light, "translucent" meaning that the conveying plate scatters visible light, for example by being configured as a pane of frosted glass.

In one advantageous configuration of the conveyor, provision is made that the conveyor comprises an illumination means, wherein the conveying plate can be backlit by means of the illumination means. "Can be backlit" in this case means that components arranged on the conveying plate can be illuminated from the side by which they lie on the conveying plate. By such a configuration of the conveyor, analysis of components which are arranged on the conveying plate is facilitated, in particular if the analysis takes place by means of an optical system.

One advantageous implementation of the inventive concept provides that the conveyor comprises a device control unit, wherein at least the pulse generators of the conveyor are controllable by means of the device control unit, wherein the device control unit comprises an interface means, wherein the conveyor can be brought into an operative connection with an external device by means of the interface means of the device control unit. Such a configuration of the conveyor makes it possible for the conveyor to be able to be brought into an operative connection for example with a process control system, so that operation of the conveyor can be coordinated with further devices which take part in a production process.

In a particularly preferred configuration of the conveyor, provision is made that the conveyor comprises a cancellation control unit and a device control unit, wherein the cancellation control unit controls the equalising pulse generators independently of the pulse generators controlled by the device control unit. Such a configuration of the conveyor makes it possible for cancelling of undesirable vibrations to be able to be carried out independently by the conveyor.

In particular in order to be able to displace the components even over relatively long displacement paths with as uniform as possible a movement from the first component position to the second component position, provision is advantageously made that at least one of the pulse generators is designed as an oscillator, wherein an oscillation can be generated by the pulse generator which is designed as an oscillator. With such a configuration of the conveyor, provision may be made that in each case instead of and/or in addition to the pulse and the counter-pulse an oscillation and a counter-oscillation can be able to be generated by the pulse generators which are designed as oscillators, wherein the oscillation and the counter-oscillation, the oscillation and the counter-pulse and/or the pulse and the counter-oscillation can be adapted to each other such that they at least in part interfere destructively with each other, so that the resultant force which acts on the substructure can be reduced.

In the case of pulse generators which act as oscillators, provision is advantageously made that the oscillation can be transmitted to the equalising pulse generator with a phase shift of 180 degrees, so that the counter-oscillation can be generated by the equalising pulse generator.

In one advantageous configuration of the conveyor, provision is made that an amplitude of the counter-oscillation which can be generated by the equalising pulse generator which acts as an oscillator is changeable, so that the counter-force can be increased without the counter-mass having to be changed. An increase in the amplitude of the counter-oscillation while the frequency of the counter-oscillation remains the same leads to greater acceleration, so that the counter-force can be increased while the counter-mass remains the same.

In the case of pulse generators which act as oscillators, provision is furthermore advantageously made that a first partial conveying oscillation can be generated by one of the pulse generators, wherein a second partial conveying oscillation can be generated by another of the pulse generators, wherein the first partial conveying oscillation and the second partial conveying oscillation in the conveying plate can be superimposed to form a conveying oscillation, wherein the conveying force can be exerted on the components by the conveying plate which is caused to oscillate with the conveying oscillation, so that the components arranged on the conveying plate are displaceable from the first storage position to the second storage position.

Furthermore, provision is advantageously also made that merely one of the two pulse generators can act as an oscillator, so that the first partial conveying oscillation can be generated by the pulse generator which acts as an oscillator, wherein the first partial conveying pulse can be generated by the other pulse generator, wherein the first partial conveying oscillation and the first partial conveying pulse can be superimposed in the conveying plate to form the conveying oscillation, wherein the conveying force can be exerted on the components by the conveying plate which is caused to oscillate with the conveying oscillation, so that the components arranged on the conveying plate are displaceable from the first storage position to the second storage position.

In this case, provision is advantageously also made that one of the partial conveying oscillations may have a frequency of 0 Hz, or that one of the partial conveying pulses has an amount of 0, i.e. that at least one of the pulse generators is not actively deflected out of its non-operative position.

Furthermore, in the case of pulse generators which act as oscillators, provision is advantageously made that a first partial counter-oscillation can be generated by one of the equalising pulse generators, wherein a second partial counter-oscillation can be generated by another of the equalising pulse generators, wherein the first partial counter-oscillation and the second partial counter-oscillation can be superimposed to form a total counter-oscillation, wherein the resultant counter-force is exerted on the substructure by the total counter-oscillation, wherein the resultant counter-force is in an opposite direction to the disruptive force exerted on the substructure by the conveying oscillation and/or the conveying pulse and wherein the resultant force which acts on the substructure and which results from the resultant counter-force and the disruptive force is reduced by the resultant counter-force.

Below, some exemplary embodiments of the inventive concept, which are illustrated in the drawings, will be discussed in greater detail.

BRIEF DESCRIPTION OF THE DRAWINGS

FIG. 3 is a schematic representation of an embodiment of the conveyor with a cancellation control unit and a device control unit.

FIGS. 4A and 4B are schematic representations of an embodiment of the conveyor with conveying plate and counter-mass.

DETAILED DESCRIPTION

Figure 1:
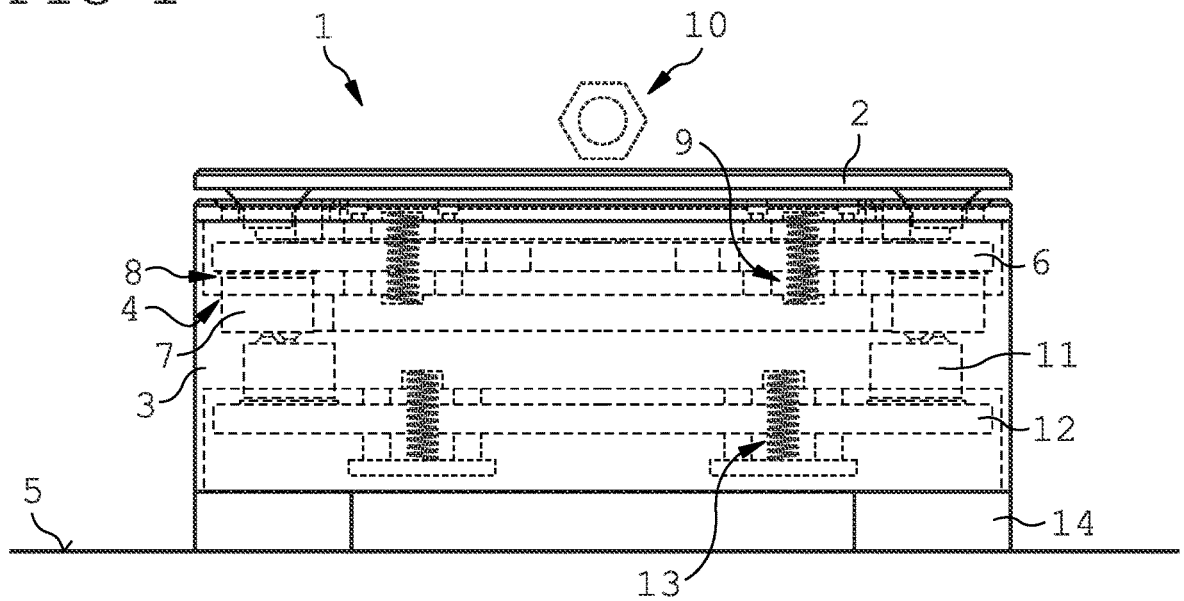
FIG. 1 is a schematically illustrated sectional view of an embodiment of the conveyor.

FIG. 1 shows a schematically illustrated sectional view of an embodiment of a conveyor 1. The conveyor 1 comprises a conveying plate 2, a substructure 3 and also four pulse generators 4.

In the sectional view shown, merely two of the four pulse generators 4 are visible, of which one is provided with a reference numeral. In each case both a pulse and an oscillation can be generated by the pulse generators 4. The pulse generators 4 are fixed on the substructure 3, and the substructure 3 stands on a base surface 5. The substructure 3 comprises a plate receptacle 6 at a distance from the base surface, on which the conveying plate 2 is fixed in a clamping manner. The pulse generators 4 are designed as electromagnetic components which have a coil portion 7. A magnetic field can be generated by the coil portion 7. The magnetic field generated may also be a pulsating one. "Pulsating" in the present case means that the magnetic field has a field strength which is changeable over time with an in particular sinusoidal form. The plate receptacle 6 comprises reaction elements 8 which are arranged above the coil portions 7 of the pulse generators 4. Between the pulse generators 4 and the plate receptacle 6, an operative connection is produced in that the magnetic field generated by the coil portions 7 of the pulse generators 4 acts on the reaction element 8. The conveying plate 2 is brought into an operative connection with the pulse generators 4 by means of the plate receptacle 6. The pulse generated by the pulse generators 4 by means of the reaction elements 8 can thus be transmitted to the conveying plate 2.

The plate receptacle 6 is fixed on the substructure 3 by means of an upper spring arrangement 9 and is resiliently mounted by spring elements of the upper spring arrangement 9. The plate receptacle 6, the conveying plate 2 and the upper spring arrangement 9 form a mechanically resonant system which can be subjected to the pulse electromagnetically by means of the coil portions 7 of the pulse generators 4 and the reaction elements 8 which are fixed on the plate receptacle 6. The conveyor 1 shown in FIG. 1 is illustrated in its non-operative state, with no forces other than gravity acting on the elements of the conveyor 1 in the non-operative state.

Three schematically illustrated components 10 are arranged on the conveying plate 2. By displacement of the plate receptacle by means of a pulse generated by the pulse generators 4, the components 10 can be separated from each other, singulated and conveyed, with a force being exerted on the substructure 3 by the pulse.

The conveyor 1 comprises four equalising pulse generators 11 and also a counter-mass 12. Of the four equalising pulse generators 11, only two are visible in the sectional view shown, of which one is designated. The equalising pulse generators 11, similarly to the pulse generators 4, are designed as electromagnetic components which have a coil portion 7. A magnetic field, which may also be a pulsating one, can be generated by the coil portion 7 of the equalising pulse generators 11 as well. The counter-mass 12 comprises reaction elements 8 which are arranged beneath the coil portions 7 of the equalising pulse generators 11. Between the equalising pulse generators 11 and the counter-mass 12, an operative connection is produced in that the magnetic field generated by the coil portions 7 of the equalising pulse generators 11 acts on the reaction element 8.

The counter-mass 12 is fixed on the substructure 3 by means of a lower spring arrangement 13 and is resiliently mounted by spring elements of the spring arrangement 13. The counter-mass 12 and the lower spring arrangement 13 form a mechanically resonant system which is displaceable electromagnetically by means of the coil portions 7 of the equalising pulse generators 11 and the reaction elements 8 which are fixed on the counter-mass 12, in that said system can be subjected to a counter-pulse.

A counter-force which is in an opposite direction to the force is exerted on the substructure 3 by the counter-pulse. A resultant force resulting from the force and the counter-force, which acts on the substructure 3, is reduced by the counter-force. In the embodiment illustrated, the counter-mass is adapted to the conveyor 1 such that an amount of the force is equal to an amount of the counter-force, so that the resultant force can be cancelled completely.

The conveyor 1 shown in FIG. 1 also comprises four stand elements 14 with which the substructure 3 stands on the base surface 5. The stand elements 14 are manufactured from an elastomer and have vibration-damping properties. The conveying plate 2 of the conveyor 1 is produced from a translucent material and the conveyor 1 can be brought into an operative connection with an illumination means by means of which the conveying plate 2 can be backlit.

Figure 2:
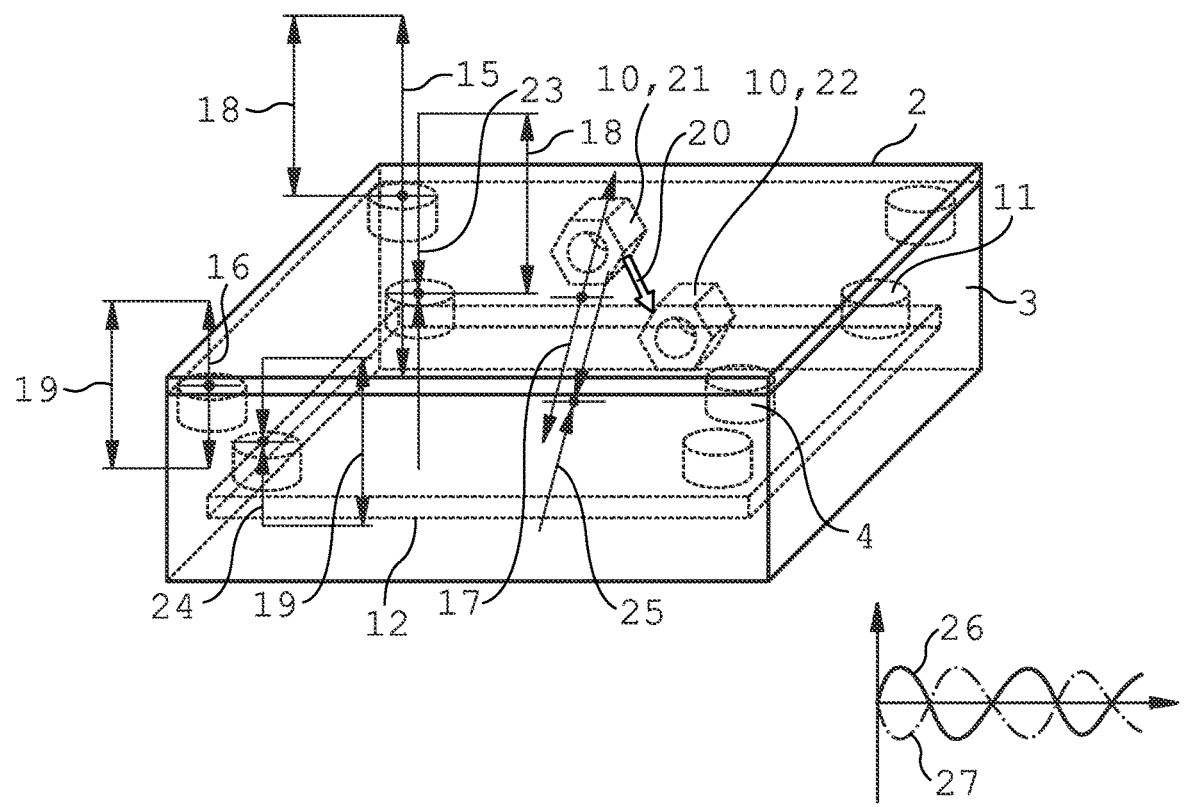
FIG. 2 is a simplified perspective view of the embodiment of the conveyor shown in FIG. 1.

FIG. 2 shows a schematically illustrated perspective view of the conveyor 1 illustrated in FIG. 1, with merely the four pulse generators 4, the conveying plate 2, the substructure 3, the four equalising pulse generators 11 and the counter-mass 12 being illustrated. A component 10 is arranged on the conveying plate 2 of the conveyor 1.

A first partial conveying pulse 15 is generated by one of the pulse generators 4 of the conveyor 1 illustrated. A second partial conveying pulse 16 is generated by a further pulse generator 4. The partial conveying pulses 15, 16 are superimposed in the conveying plate 2 to form a conveying pulse 17. The first partial conveying pulse 15 has a first pulse vector 18, the amount of which is greater than an amount of a second pulse vector 19 of the second partial conveying pulse 16, the partial conveying pulses 15, 16 being oriented parallel to each other and acting simultaneously on the conveying plate 2. A conveying force 20 is exerted on the component 10 by the conveying plate 2 which is subjected to the conveying pulse 17, so that the component 10 arranged on the conveying plate 2 is displaceable from a first storage position 21 into a second storage position 22.

In the conveyor 1 illustrated, a first partial counter-pulse 23 is generated by one of the equalising pulse generators 11. A second partial counter-pulse 24 is generated by another of the equalising pulse generators 11. The two partial counter-pulses 23, 24 are superimposed in the counter-mass 12 to form a total counter-pulse 25.

A disruptive force 26 is exerted on the substructure 3 by the conveying pulse 17. A resultant counter-force 27 which is in an opposite direction to the disruptive force 26 is exerted on the substructure 3 by the total counter-pulse 25, with an amount of the resultant counter-force 27 being equal to an amount of the disruptive force 26. The two forces 26, 27 neutralise each other.

FIG. 3 shows a schematic representation of an embodiment of the conveyor 1 with a cancellation control unit 28 and a device control unit 29. Furthermore, a pulse generator 4 of the conveyor 1 which is fixed on the substructure 3 is illustrated which is brought into an operative connection with a conveying plate 2 which is illustrated merely schematically. With the pulse generator 4 illustrated there is associated an equalising pulse generator 11 which likewise is fixed on the substructure 3 and which is brought into an operative connection with the counter-mass 12.

A pulse-generator control unit 30 is brought into an operative connection with the equalising pulse generator 11 of the conveyor 1, with merely one of the equalising pulse generators 11 being illustrated and designated. A frequency and an amplitude of the counter-oscillation generated by the equalising pulse generator 11 can be changed by the pulse-generator control unit 30.

The pulse generator 4 can be controlled by means of the device control unit 29 of the conveyor 1 illustrated. The device control unit 29 comprises an interface means 31 by means of which the conveyor 1 can be brought into an operative connection with an external device 32.

FIGS. 4A and 4B show schematically illustrated sectional views of an embodiment of the conveyor 1, with merely the substructure 3, the conveying plate 2 and the counter-mass 12 being illustrated and designated.

In FIG. 4A, the conveyor 1 is shown in its non-operative state, in which the conveying plate 2 and the counter-mass 12 are arranged in their respective non-operative positions. In FIG. 4B, the conveyor 1 is shown once the conveying plate 2 has been subjected to the conveying pulse and the counter-mass 12 to the counter-pulse, as a result of which a distance 33 between the conveying plate 2 and the counter-mass 12 is increased.

As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. The articles "a" and "an" as used in this application and the appended claims should be construed to mean "one or more" unless specified otherwise or clear from context to be directed to a singular form.

LIST OF REFERENCE NUMERALS 1. conveyor
2. conveying plate
3. substructure
4. pulse generator
5. base surface
6. plate receptacle
7. coil portion
8. reaction element
9. upper spring arrangement
10. component
11. equalising pulse generator
12. counter-mass
13. lower spring arrangement
14. stand element
15. first partial conveying pulse
16. second partial conveying pulse
17. conveying pulse
18. first deflection
19. second deflection
20. conveying force
21. first storage position
22. second storage position
23. first partial counter-pulse
24. second partial counter-pulse
25. total counter-pulse
26. disruptive force
27. resultant counter-force
28. cancellation control unit
29. device control unit
30. pulse-generator control unit
31. interface means
32. external device
33. distance

The invention claimed is:

1. A conveyor (1) for separating, singulating or conveying a component (10) by means of a mechanical pulse (15, 16, 17), wherein the conveyor (1) comprises:
   a conveying plate (2) for receiving the component (10),
   a substructure (3), and
   at least two pulse generators (4),
   wherein a first partial conveying pulse (15) can be generated by one of the at least two pulse generators (4),
   wherein a second partial conveying pulse (16) can be generated by another of the at least two pulse generators (4),
   wherein the first partial conveying pulse (15) and the second partial conveying pulse (16) can be superimposed in the conveying plate (2) to form a conveying pulse (17),
   wherein a conveying force (20) can be exerted on the component (10) by the conveying plate (2) which is subjected to the conveying pulse (17), so that the component (10) arranged on the conveying plate (2) is displaceable from a first storage position (21) into a second storage position (22),
   wherein the conveyor (1) when used as intended stands on a base surface (5) with the substructure (3), and the conveying plate (2) is arranged on the substructure (3) at a distance from the base surface (5),
   wherein the at least two pulse generators (4) are fixed on the substructure (3) and can be brought into an operative connection with the conveying plate (2), so that the first partial conveying pulse (15) and the second partial conveying pulse (16) generated by the at least two pulse generators (4) can be transmitted to the conveying plate (2), and
   wherein a force is exerted on the substructure (3) by the first partial conveying pulse (15) and the second partial conveying pulse (16),
   wherein the conveyor (1) further comprises at least two equalising pulse generators (11) which are fixed on the substructure (3),
   wherein a first partial counter-pulse (23) can be generated by one of the at least two equalising pulse generators (11),
   wherein a second partial counter-pulse (24) can be generated by another of the at least two equalising pulse generators (11),
   wherein the first partial counter-pulse (23) and the second partial counter-pulse (24) can be superimposed to form a total counter-pulse (25),
   wherein a resultant counter-force (27) is exerted on the substructure (3) by the total counter-pulse (25),
   wherein the resultant counter-force (27) is in an opposite direction to a disruptive force (26) exerted on the substructure (3) by the conveying pulse (17), and
   wherein the resultant force which acts on the substructure (3) and which results from the resultant counter-force (27) and the disruptive force (26) is reduced by the resultant counter-force (27).

2. The conveyor (1) according to claim 1,
wherein the one of the at least two equalising pulse generators (11) comprises a counter-mass (12) or can be brought into an operative connection with a counter-mass (12),
wherein the resultant counter-force (27) can be increased by the counter-mass (12).

3. The conveyor (1) according to claim 2,
wherein the counter-mass (12) can be adapted to the conveyor (1) such that an amount of the force is equal to an amount of the resultant counter-force, so that the resultant force can be cancelled completely.

4. The conveyor (1) according to claim 2,
wherein an amount of the total counter-pulse which can be generated by the at least two equalising pulse generators (11) is changeable, so that the resultant counter-force can be increased without the counter-mass (12) having to be changed.

5. The conveyor (1) according to claim 1,
wherein the substructure (3) comprises a plate receptacle (6) at a distance from the base surface (5), on which receptacle the conveying plate (2) can be fixed,
wherein the at least two pulse generators (4) can be brought into an operative connection with the plate receptacle (6) and
wherein the conveying plate (2) can be brought into an operative connection with the at least two pulse generators (4) by the plate receptacle (6).

6. The conveyor (1) according to claim 1,
wherein the substructure (3) comprises a stand element (14),
wherein the substructure (3) when used as intended stands on the base surface (5) with the stand element (14).

7. The conveyor (1) according to claim 6,
wherein the stand element (14) has vibration-damping properties.

8. The conveyor (1) according to claim 1,
wherein the conveying plate (2) is produced at least in portions from a translucent material.

9. The conveyor (1) according to claim 1,
wherein the conveyor (1) comprises a device control unit (29),
wherein the at least two pulse generators (4) of the conveyor (1) are controllable by the device control unit (29),
wherein the device control unit (29) comprises an interface means (31),
wherein the conveyor (1) can be brought into an operative connection with an external device (32) by the interface means (31) of the device control unit (29).

10. The conveyor (1) according to claim 1,
wherein at least one of the at least two pulse generators (4) or at least one of the at least two equalising pulse generators (11) is designed as an oscillator, and
wherein an oscillation can be generated by the oscillator.

* * * * *